United States Patent
Solum et al.

(10) Patent No.: US 9,942,668 B2
(45) Date of Patent: *Apr. 10, 2018

(54) HEARING AID USING WIRELESS TEST MODES AS DIAGNOSTIC TOOL

(71) Applicant: Starkey Laboratories, Inc., Eden Prairie, MN (US)

(72) Inventors: Jeffrey Paul Solum, Greenwood, MN (US); Beau Jay Polinske, Minneapolis, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,420

(22) Filed: Nov. 14, 2016

(65) Prior Publication Data

US 2017/0127191 A1    May 4, 2017

Related U.S. Application Data

(63) Continuation of application No. 13/843,725, filed on Mar. 15, 2013, now Pat. No. 9,497,553.

(51) Int. Cl.
*H04R 25/00* (2006.01)
*H04B 17/309* (2015.01)

(52) U.S. Cl.
CPC ......... *H04R 25/305* (2013.01); *H04B 17/309* (2015.01); *H04R 25/554* (2013.01); *H04R 2225/55* (2013.01)

(58) Field of Classification Search
CPC ..... H04R 25/554; H04R 25/305; H04R 29/00
(Continued)

(56) References Cited

U.S. PATENT DOCUMENTS 7,359,701 B2    4/2008   Zhao et al.
7,688,991 B2    3/2010   Baechler
(Continued)

FOREIGN PATENT DOCUMENTS

EP    1033022 A2    9/2000
EP    1554597 A2    7/2005
(Continued)

OTHER PUBLICATIONS

"U.S. Appl. No. 13/843,725, Response filed Jun. 30, 2016 to Final Office Action dated Mar. 3, 2016", 12 pgs.
(Continued)

*Primary Examiner* — Melur Ramakrishnaiah
(74) *Attorney, Agent, or Firm* — Schwegman Lundberg & Woessner, P.A.

(57) ABSTRACT

Various system embodiments comprise a plurality of devices configured to wirelessly communicate with each other. The plurality of devices includes a battery-operated hearing aid configured to communicate with another device using Bluetooth Low Energy (BLE) wireless communication technology. A BLE tester is configured to test the hearing aid for the performance of BLE wireless communication via a wireless link. One embodiment uses a wireless test mode as a diagnostic tool for analyzing the wireless communication environment, such as when the communication with the hearing aid is interfered in a noisy environment.

20 Claims, 15 Drawing Sheets

(58) Field of Classification Search
USPC ......... 381/60, 312–316; 370/437; 455/161.1, 455/161.2, 161.3
See application file for complete search history.

(56) References Cited

U.S. PATENT DOCUMENTS

| | | | |
|---|---|---|---|
| 8,081,787 | B2 | 12/2011 | Haenggi et al. |
| 8,249,512 | B2 | 8/2012 | Prather |
| 8,331,869 | B2 | 12/2012 | Foegelle |
| 8,340,590 | B2 | 12/2012 | Zhao et al. |
| 9,497,553 | B2 | 11/2016 | Solum et al. |
| 9,584,927 | B2 | 2/2017 | Greenbush |
| 2005/0245286 | A1 | 11/2005 | Lin et al. |
| 2006/0274747 | A1 | 12/2006 | Duchscher et al. |
| 2007/0049983 | A1 | 3/2007 | Freeberg |
| 2008/0240453 | A1 | 10/2008 | Westergaard |
| 2009/0046625 | A1 | 2/2009 | Diener et al. |
| 2009/0316922 | A1 | 12/2009 | Merks et al. |
| 2010/0161208 | A1 | 6/2010 | Akita et al. |
| 2011/0022916 | A1* | 1/2011 | Desai ............... G06F 1/3203 714/748 |
| 2011/0067082 | A1 | 3/2011 | Walker |
| 2011/0085687 | A1 | 4/2011 | Edgar |
| 2011/0216809 | A1 | 9/2011 | Gan et al. |
| 2011/0299693 | A1* | 12/2011 | Cherigui ............ H04R 25/30 381/60 |
| 2011/0312282 | A1 | 12/2011 | Prather |
| 2012/0021386 | A1 | 1/2012 | Anderson et al. |
| 2013/0034005 | A1 | 2/2013 | Xhafa et al. |
| 2014/0270211 | A1 | 9/2014 | Solum et al. |
| 2014/0270213 | A1 | 9/2014 | Greenbush |
| 2014/0270288 | A1 | 9/2014 | Kryzer |

FOREIGN PATENT DOCUMENTS

| | | | |
|---|---|---|---|
| EP | 1609316 | A2 | 12/2005 |
| EP | 1860914 | B1 | 11/2007 |
| EP | 1980132 | B1 | 10/2008 |
| EP | 2103176 | B1 | 5/2011 |
| EP | 2328370 | A1 | 6/2011 |
| EP | 2779698 | A2 | 9/2014 |
| EP | 2779699 | A2 | 9/2014 |
| EP | 2779700 | A1 | 9/2014 |
| WO | WO-2007068243 | A1 | 6/2007 |
| WO | WO-2009063097 | A2 | 5/2009 |

OTHER PUBLICATIONS

"U.S. Appl. No. 13/843,725, Final Office Action dated Mar. 3, 2016", 19 pgs.
"U.S. Appl. No. 13/843,725, Non Final Office Action dated Feb. 6, 2015", 14 pgs.
"U.S. Appl. No. 13/843,725, Non Final Office Action dated Oct. 26, 2015", 16 pgs.
"U.S. Appl. No. 13/843,725, Notice of Allowance dated Jun. 5, 2015", 5 pgs.
"U.S. Appl. No. 13/843,725, Notice of Allowance dated Jul. 19, 2016", 5 pgs.
"U.S. Appl. No. 13/843,725, Response filed Jan. 27, 2016 to Non Final Office Action dated Oct. 26, 2015", 11 pgs.
"U.S. Appl. No. 13/843,725, Response filed May 6, 2015 to Non Final Office Action dated Feb. 6, 2015", 9 pgs.
"U.S. Appl. No. 13/843,852, Advisory Action dated Oct. 22, 2015", 3 pgs.
"U.S. Appl. No. 13/843,852, Advisory Action dated Nov. 18, 2014", 3 pgs.
"U.S. Appl. No. 13/843,852, Final Office Action dated Aug. 13, 2015", 15 pgs.
"U.S. Appl. No. 13/843,852, Final Office Action dated Sep. 8, 2014", 13 pgs.
"U.S. Appl. No. 13/843,852, Non Final Office Action dated Feb. 25, 2016", 14 pgs.
"U.S. Appl. No. 13/843,852, Non Final Office Action dated Apr. 29, 2015", 14 pgs.
"U.S. Appl. No. 13/843,852, Non Final Office Action dated May 19, 2014", 12 pgs.
"U.S. Appl. No. 13/843,852, Preliminary Amendment filed Mar. 11, 2014", 6 pgs.
"U.S. Appl. No. 13/843,852, Response filed Jul. 29, 2015 to Non Final Office Action dated Apr. 29, 2015", 9 pgs.
"U.S. Appl. No. 13/843,852, Response filed Aug. 19, 2014 to Non Final Office Action dated May 19, 2014", 13 pgs.
"U.S. Appl. No. 13/843,852, Response filed Oct. 13, 2015 to Final Office Action dated Aug. 13, 2015", 10 pgs.
"U.S. Appl. No. 13/843,852, Response filed Nov. 10, 2014 to Final Office Action dated Sep. 8, 2014", 10 pgs.
"U.S. Appl. No. 13/843,852, Response filed Nov. 13, 2015 to Advisory Action dated Oct. 22, 2015", 9 pgs.
"U.S. Appl. No. 14/209,954, Corrected Notice of Allowance dated Jan. 6, 2017", 2 pgs.
"U.S. Appl. No. 14/209,954, Final Office Action dated Jul. 15, 2016", 10 pgs.
"U.S. Appl. No. 14/209,954, Non Final Office Action dated Feb. 2, 2016", 7 pgs.
"U.S. Appl. No. 14/209,954, Notice of Allowance dated Oct. 19, 2016", 9 pgs.
"U.S. Appl. No. 14/209,954, Response filed Sep. 13, 2016 to Final Office Action dated Jul. 15, 2016", 7 pgs.
"U.S. Appl. No. 14/209,954, Response filed Jun. 2, 2016 to Non Final Office Action dated Feb. 2, 2016", 8 pgs.
"U.S. Appl. No. 15/443,755, Preliminary Amendment filed May 3, 2017", 5 pgs.
"European Application Serial No. 14159963.9, Extended European Search Report dated Jun. 8, 2016", 7 pgs.
"European Application Serial No. 14159967.0, Extended European Search Report dated Jun. 3, 2016", 7 pgs.
"European Application Serial No. 14159967.0, Response filed Jan. 9, 2017 to Extended European Search Report dated Jun. 3, 2016", 7 pgs.
"European Application Serial No. 14159982.9, Extended European Search Report dated Jul. 1, 2014", 7 pgs.
"European Application Serial No. 14159982.9, Response filed Apr. 9, 2015 to Extended European Search Report dated Jul. 1, 2014", 16 pgs.
"European Application Serial No. 14159982.9, Summons to Attend Oral Proceedings dated Dec. 21, 2016", 6 pgs.
Bresciani, Laurent, "Wireless Signal Stats Plug-In", Wildpackets, (May 2, 2012), 2 pgs.
"BPA 600 Dual Mode Bluetooth Protocol Analyzer User Manual", Retrieved from the Internet<URL:http://www.fte.com/docs/usermanuals/usermanualbpa600.pdf> [retrieved on Dec. 3, 2015], (2015) 371 pgs.
"European Application Serial No. 17173806.5, Extended European Search Report dated Jan. 25, 2018", 11 pgs.
"Frontline Announces the ComProbe BPA 600 Dual Mode Bluetooth Protocol Analyzer", Retrieved from the Internet<URL:http://www.fte.com/docs/PressReleases/Press Release-ComProbeBPA600AnalyzerIntroduced.pdf>[retrieved on Nov. 6, 2015], (Nov. 28, 2013).
El-Bendary, M A M, et al., "Bluetooth performance improvement over different channels through channel coding", Systems, Signals and Devices, 2008. IEEE SSD 2008. 5th International Multi-Conference on, IEEE, Piscataway, NJ, US, (Jul. 20, 2008), 1-5.

* cited by examiner

HEARING AID USING WIRELESS TEST MODES AS DIAGNOSTIC TOOL

CROSS-REFERENCE TO RELATED APPLICATIONS

The present application is a continuation of U.S. patent application Ser. No. 13/843,725, filed Mar. 15, 2013, which is related to U.S. patent application Ser. No. 12/552,513, entitled "SYSTEMS AND METHODS FOR MANAGING WIRELESS COMMUNICATION LINKS FOR HEARING ASSISTANCE DEVICES", filed Sep. 2, 2009, which claims the benefit under 35 U.S.C. 119(e) of U.S. Provisional Patent Application Ser. No. 61/094,021, filed Sep. 3, 2008, which is incorporated herein by reference in its entirety.

U.S. patent application Ser. No. 13/842,725 is also related to U.S. patent application Ser. No. 13/438,52, entitled "METHOD AND APPARATUS TO DISPLAY INTERFERENCE FOR A WIRELESS HEARING ASSISTANCE DEVICE PROGRAMMER", filed on even date herewith, and U.S. Patent Application Ser. No. 61/801,152, entitled "WIRELESS ENVIRONMENT INTERFERENCE DIAGNOSTIC HEARING ASSISTANCE DEVICE SYSTEM", filed on even date herewith, which are incorporated herein by reference in their entirety.

TECHNICAL FIELD

This application relates generally to wireless networks and, more particularly, to systems, devices and methods for managing wireless communication links for hearing assistance devices including those using Bluetooth Low Energy (BLE) communication technology.

BACKGROUND

Radio waves are electromagnetic waves that can be used in wireless communication. The frequencies of these waves serve as physical communication channels. The radio frequency (RF) spectrum has a finite range of frequencies, and thus a limited number of channels. In the United States, for example, the Federal Communications Commission (FCC) decides how the spectrum is allocated and what bands are used for what purpose.

Communication signals on the same channel interfere, assuming the strengths of the signals are non-negligible due to transmission power and distance. Also, communication signals on adjacent channels may interfere with communications on the desired channel because of inadequate filtering, tuning or frequency control. Adjacent channel interference can increase with an increase in signal power in adjacent channels.

Most countries of the world have allocated certain frequency spectrums for commercial use as "unlicensed" wireless bands. For example, the FCC has designated license-free bandwidth segments for industrial, scientific and medical (ISM) uses. Various commercial applications use this unlicensed bandwidth for short range wireless communication.

Channels are not allocated within the license-free band. Commercial devices designed to operate in the license-free band are constrained to transmit using a relatively low power, which allows more commercial devices to use the unlicensed frequency bands by increasing the reuse of a frequency. Spread spectrum systems mitigate interference by spreading their information over a much larger bandwidth than the information requires. This has the advantage of spreading any narrowband interference encountered within the channel over a large bandwidth which can then be integrated out by the receiver. The transmitter and receiver coordinate and manage the spreading sequences. This adds complexity and power to spread the signal using either fast frequency hopping or direct sequence phase manipulation. This added complexity and power may prevent these schemes from being used in ultra-low power communications systems.

SUMMARY

Various system embodiments comprise a plurality of devices configured to wirelessly communicate with each other. The plurality of devices includes a battery-operated hearing aid configured to communicate with another device using Bluetooth Low Energy (BLE) wireless communication technology. A BLE tester is configured to test the hearing aid for the performance of BLE wireless communication via a wireless link. One embodiment uses a wireless test mode as a diagnostic tool for analyzing the wireless communication environment, such as when the communication with the hearing aid is interfered in a noisy environment.

In one embodiment, a system for managing wireless communication includes a first device and a second device. The first device includes a BLE wireless communication circuit configured to receive and transmit data using BLE wireless communication technology. The second device includes a BLE tester configured to wirelessly communicate with the first device and test the BLE wireless communication circuit according to a wireless test mode in response to a test command associated with the wireless test mode. The second device includes an analysis initiator configured to generate the test command in response to a signal requesting a diagnostic analysis of an environment of the wireless communication. In one embodiment, at least one of the first device and the second device is a hearing aid.

In one embodiment, a method for wirelessly communicating with a hearing aid includes performing wireless communication with the hearing aid using BLE wireless communication technology and performing a diagnostic analysis of an environment of the wireless communication. The performance of the diagnostic analysis includes establishing a wireless link between the hearing aid and a BLE tester, testing the hearing aid for quality of data transmission associated with the wireless link according to a specified wireless test mode, and producing information indicative of one or more characteristics of the environment of the wireless communication.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1A:
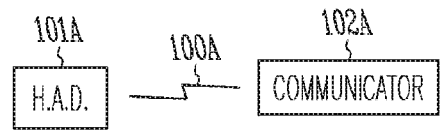
FIGS. 1A-1D illustrate a wireless link between various embodiments of a hearing assistance device and a communicator.

FIGS. 1A-1D illustrate a wireless link between various embodiments of a hearing assistance device and a communicator. FIG. 1A illustrates a wireless communication link 100A between the hearing assistance device 101A and the communicator 102A. The communication link is used to communicate information. Examples of information include audio data or other data, commands, and programming instructions. In RF communication, the communication link uses a transmission frequency to establish the link in a communication channel. Examples of hearing assistance devices include both prescription devices and non-prescription devices. Examples of hearing assistance devices include hearing aids, headphones, assisted listening devices, earbuds, and the like. The communicator represents a device that communicates information to the hearing assistance device over the wireless communication link.

Figure 1B:
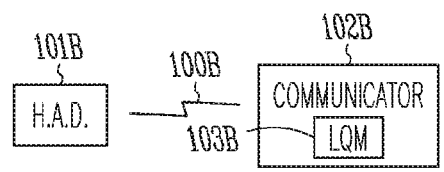

FIG. 1B illustrates the system of FIG. 1A, where the communicator includes a link quality management device. As will be described below, the link quality management device 103B assesses the quality of the communication link 100B, and controls the adjustments to the communication over the link. Some embodiments, the communication adjustments are made by the communicator 102B. Some embodiments send a command from the communicator 102B to the hearing assistance device 101B instructing the hearing assistance device to take an action in an effort to improve the quality of the wireless communication link. In some embodiments, when it is determined that an action should be taken to adjust communication and improve the link quality, the communicator makes an adjustment and sends a command to the hearing assistance device instructing the hearing assistance device to take an action to adjust communication and improve the link quality.

Figure 1C:
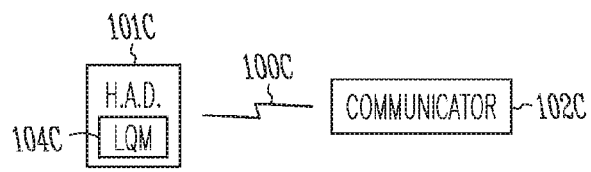

FIG. 1C illustrates the system of FIG. 1A, where the hearing assistance device includes a link quality management device. As will be described below, the link quality management device 104C assesses the quality of the communication link 100C, and controls the adjustments to the communication over the link. Some embodiments, the communication adjustments are made by the hearing assistance device 101C. Some embodiments send a command from the hearing assistance device 101C to the communicator 102C instructing the communicator to take an action in an effort to improve the quality of the wireless communication link. In some embodiments, when it is determined that an action should be taken to improve the link quality, the hearing assistance device makes an adjustment and sends a command to the communicator instructing the communicator to take an action to adjust communication and improve the link quality. In some embodiments, the hearing assistance device sends communications statistics such as CRC errors, SNR levels, FEC statistics, etc. to the host communications device so that it can take action to improve the link quality.

Figure 1D:
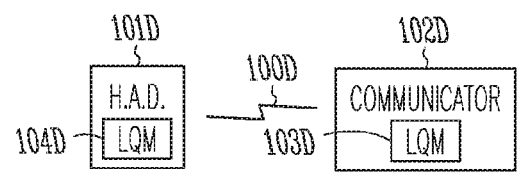

FIG. 1D illustrates the system of FIG. 1A, where both the hearing assistance device and the communicator include a link quality management device. As will be described below, the link quality management devices 103D and 104D assesses the quality of the communication link 100D, and controls the adjustments to the communication over the link. According to various embodiments, both link quality management devices monitor the link quality the same way, or the link quality management devices monitor different aspects of the link quality (e.g. distribute the link quality assessment). In some embodiments, only one of the devices operates its link quality management device to monitor link quality. The choice between the devices 103D and 104D can be made during communication initialization or can be preprogrammed. According to various embodiments, when it is determined that an action should be taken to improve the link quality, one or both of the devices 101D and 102D take an action to adjust communication and improve the link quality.

Figure 2A:
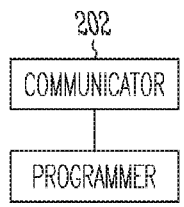
FIG. 2A-2E illustrate a communicator operably connected to different devices, according to various embodiments.
Figure 2B:
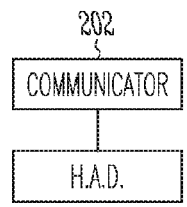
Figure 2C:
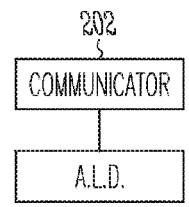
Figure 2D:
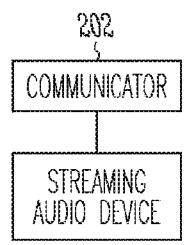
Figure 2E:
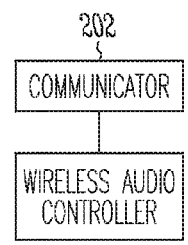

FIG. 2A-2E illustrate a communicator operably connected to different devices, according to various embodiments. The illustrated communicator 202 is a device configured to be connected to another device as a peripheral device. For example, the device and the peripheral communicator can be connected via Wireless communication such as Bluetooth or WiFi or wired technology such as USB or firewire. The peripheral communicator can be connected to a variety of devices, such as to a programmer as illustrated in FIG. 2A, a hearing assistance device as illustrated in FIG. 2B, an assisted listening device as illustrated in FIG. 2C, a streaming audio device as illustrated in FIG. 2D, and a wireless audio controller (WAC) as illustrated in FIG. 2E.

Figure 3A:
FIGS. 3A-3E illustrate a communicator integrated within different devices, according to various embodiments.
Figure 3B:
Figure 3C:
Figure 3D:
Figure 3E:

FIGS. 3A-3E illustrate a communicator integrated within different devices, according to various embodiments. The illustrated communicator 302 is a device configured to be integrated with or built within another device as a peripheral device. For example, the communicator can be an expansion card connected within a computer chassis. The communicator can be integrated with or built within a variety of devices, such as to a programmer as illustrated in FIG. 3A, a hearing assistance device as illustrated in FIG. 3B, an assisted listening device as illustrated in FIG. 3C, a streaming audio device as illustrated in FIG. 3D, and a wireless audio controller (WAC) as illustrated in FIG. 3E.

Figure 4:
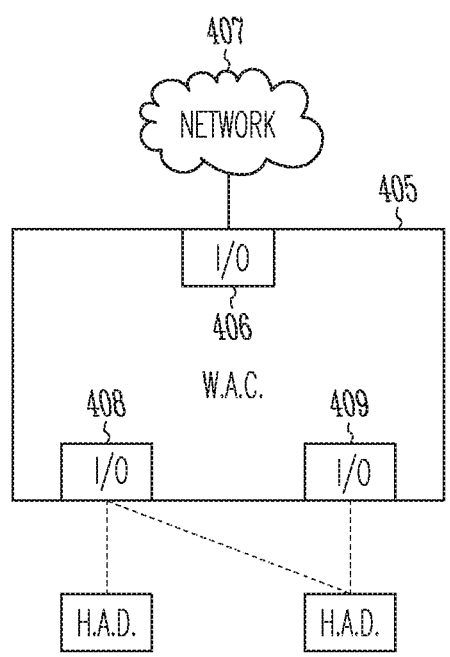
FIG. 4 illustrates an embodiment of a wireless system with a wireless audio controller (WAC) and at least one hearing assistance device.

FIG. 4 illustrates an embodiment of a wireless system with a wireless audio controller (WAC) and at least one hearing assistance device. US 2006/0274747, entitled: COMMUNICATION SYSTEM FOR WIRELESS DEVICES, and U.S. Ser. No. 11/619,541, entitled: WIRELESS SYSTEM FOR HEARING COMMUNICATION DEVICE PROVIDING WIRELESS STEREO RECEPTION MODES, both of which are incorporated herein in their entirety, and include examples of WACs. The illustrated WAC 405 includes an I/O port 406 to a network 407 (e.g., Internet, LAN, WAN, WILAN, Bluetooth, Cellular, etc.) through which data (e.g., compressed audio data) is communicated to the WAC. The illustrated WAC also includes at least one I/O port configured for use to wirelessly communicate with at least one hearing assistance device. The illustrated WAC embodiment includes two I/O ports 408 and 409 configured to be used to communicate with a hearing assistance device. For example, a first port can communicate a left channel and a second port can communicate a right channel to provide a wearer of the hearing aid devices with a stereo sound. If the link quality of one of the channels is determined to be undesirably low, the illustrated WAC is able to send the same signal to both hearing assistance devices. This signal can represent a monophonic signal to be presented to both of the hearing assistance devices, or can represent one channel of a stereophonic signal to be presented to both of the hearing assistance devices. The connection between the WAC 406 and the network 407 can be wireless, wired, or a hybrid of wired and wireless. Wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), 802.20 mobile wireless, cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter. Wired communications include, but are not limited to, one or more mono or stereo connections or digital connections having link protocols including, but not limited to IEEE 802.3 (Ethernet), 802.4, 802.5, USB, ATM, Fibrechannel, Firewire or 1394, InfiniBand, or a native streaming interface. Such connections include all past and present link protocols. It is also contemplated that future versions of these protocols and new future standards may be employed without departing from the scope of the present subject matter.

Figure 5:
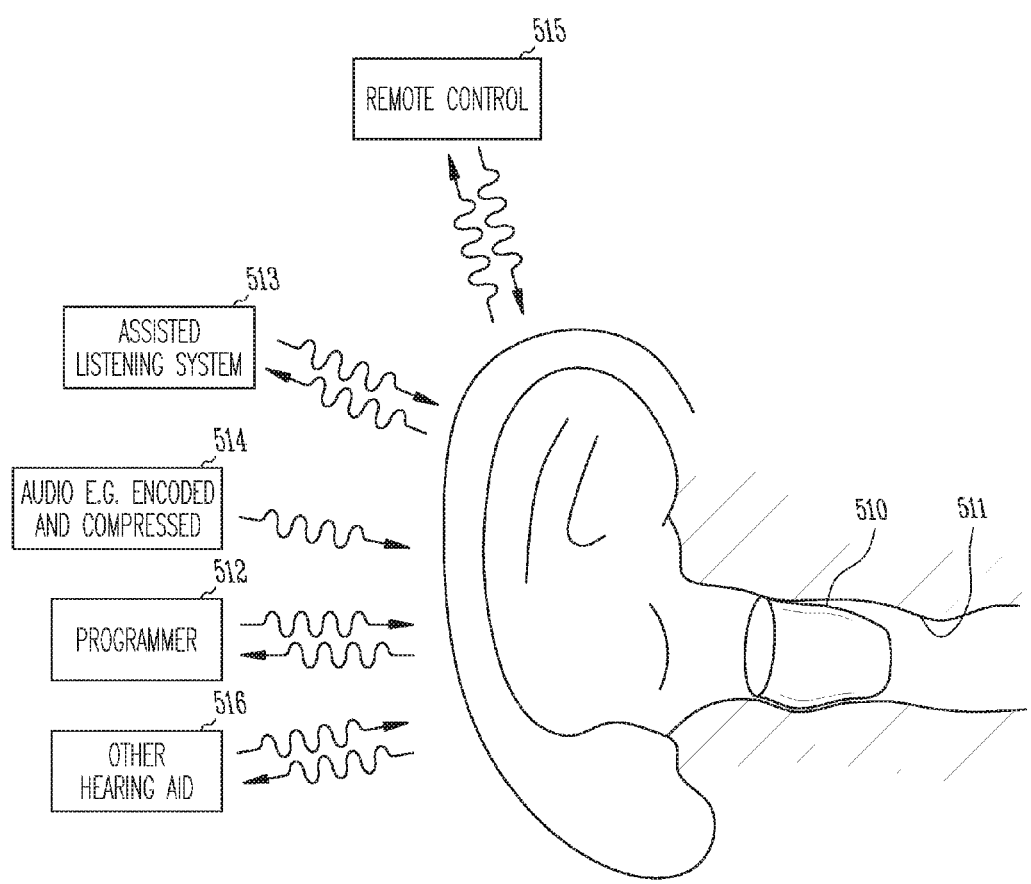
FIG. 5 illustrates various wireless communication environment(s) with a hearing aid device, according to various embodiments of the present subject matter.

FIG. 5 illustrates various wireless communication environment(s) with a hearing aid device, according to various embodiments of the present subject matter. The illustrated hearing aid device 510 is an in-the-ear hearing aid that is positioned completely in the ear canal 511. The present subject matter is not so limited, however. In addition to the illustrated in-the-ear style, the features of the present subject matter can be used in other styles of hearing assistance devices, including half-shell, in-the-canal, behind-the-ear, over-the-ear, eyeglass mount, implants, and body worn hearing aids, and further can be used in noise-protection earphones, headphones, and the like.

Referring again to FIG. 5, a wireless communication system in the hearing aid is configured to communicate with one or more devices. In various embodiments, the hearing aid uses RF wireless communication to communicate with an external programmer 512. The programmer is able to adjust the hearing aid settings such as mode, volume and the like, to download a complete hearing aid program, and to receive data from the hearing aid for data logging, diagnostics, reporting and the like. In various embodiments, the hearing aid wirelessly communicates with an assisted listening system 513 to receive an audio signal, or a device 514 that provides encoded and compressed audio, or a remote control device 515, or another hearing aid 516, or various combinations thereof.

One challenging environment for hearing aid wireless communication involves a multi-office environment where several programmers may be within range of one another and attempt to discover nodes (e.g., hearing aids) simultaneously. In addition many nodes may be within range of each programmer. Furthermore, the multi-office environment may include other wireless services and/or otherwise devices that emit electromagnetic radiation that may adversely affect the desired wireless communication.

Figure 6:
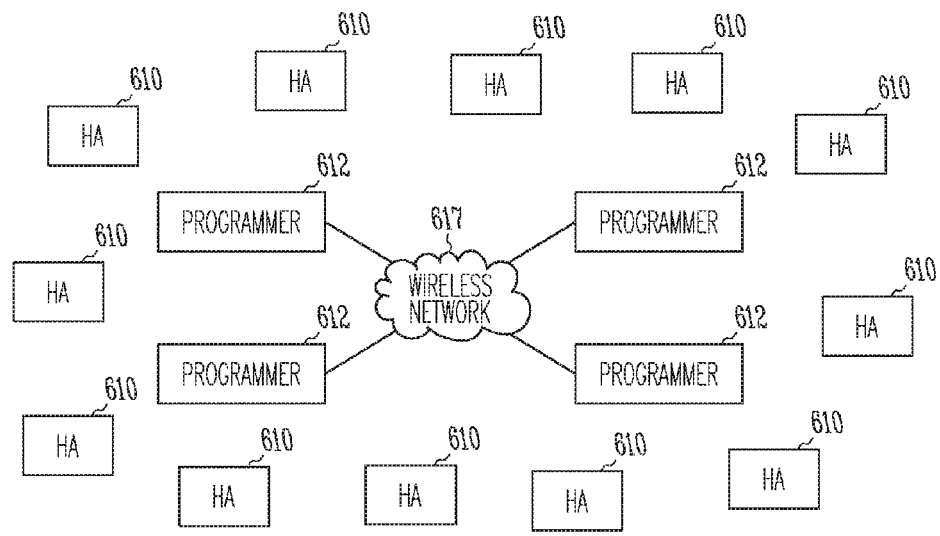
FIG. 6 illustrates a wireless communication network within a multi-office environment with multiple programmers and hearing aids.

FIG. 6 illustrates a wireless communication network within a multi-office environment with multiple programmers and hearing aids. Any of the programmers 612 are capable of discovering and communicating with hearing aids 610. Further, the programmers 612 can be wirelessly networked together, such as illustrated by the wireless network 617. Additionally, some hearing aids (e.g. left/right hearing aids for a patient) can be designed to wireless communicate with each other in addition to the programmers 612 or other communicators.

Some hearing aid embodiments incorporate a scanning feature to reduce the probability of interference. The probability that interference is on multiple channels simultaneously is significantly less, since the conditional probabilities for independent events are multiplied together for the overall probability that both channels will simultaneously experience interference. Interference can increase the duty cycle of the receiver since the detection of energy on a channel above a Receive Signal Strength Indicator (RSSI) threshold causes the receiver to stay awake. Thus, interference can adversely impact the battery life of the hearing aid. Some embodiments use a wake timer that, if the receiver is awake longer than the sleep cycle without receiving a valid packet, causes the receiver to go into a deep sleep mode with a longer sleep cycle until the interference goes away.

A system, such as the one illustrated in FIG. 6, performs a process to discover the nodes in operational proximity. Any number of channels can be assigned as discovery channels. The use of two or more discovery channels considerably increases the odds of successful links in comparison to a single discovery channel as the single channel may already be in use. These channels are reserved for node discovery of hearing aids by programmers. Programmers pick a desirable discovery channel based on a link quality assessment (LQA). Hearing aids scan the discovery channel frequencies prior to establishing a programming link. During discovery, programmers ping for nodes using a broadcast discovery message that is sent out at random intervals. The node is registered with the programmer if an acknowledgement is received by the programmer. Hearing aids register with all programmers in discovery mode within range of the hearing aid, and associate with programmers after being discovered and selected via the programmer's user interface. Once nodes are discovered, the user is notified using the user display of the hearing aids that are within range. The user then can select the nodes with which to establish a link.

Various programmer embodiments use a LQA table which is updated by scanning each available channel and is used by the programmer to determine a desirable channel, on which to establish a wireless communication session, among the available channels. The programmer sends a frequency change message to each hearing instrument. This message is acknowledged by the hearing aid. Normal data transfer to and from the hearing instrument can begin once the link has been established on the desired channel. Some programmer embodiments perform intermittent (e.g., periodic) maintenance throughout the wireless communication session. In some embodiments, the host communications device sends a maintenance message that contains the next available channel in case the link is lost due to interference as well as a transmit power control word. The channel maintenance response from the hearing instrument contains several communications metrics such as the number of successful packets received since the last maintenance response and the number of packets containing errors. This information is used by the programmer to determine the downlink quality and the uplink quality. The programmer is able to determine the downlink quality by comparing the number of no acknowledgments with the number of messages received by the hearing instrument. In addition to statistics collected during maintenance, some programmer embodiments monitor the RSSI of the nodes on each packet received. Some embodiments maintain this signal strength as a moving average in time. The signal strength can be used to adjust the power control of the uplink signal from the nodes. Adjustments can be made during maintenance messages. The links can operate on the fringe of link margin. However, if there is sufficient link margin, various embodiments allow for upstream power reduction (transmission from remote nodes/hearing aids to the host communications device) to save power in the remote nodes. As is discussed below, there are a number of ways to assess the link quality of RF communication links and a number of ways to adjust the RF communication based on the assessed link quality.

Figure 7:
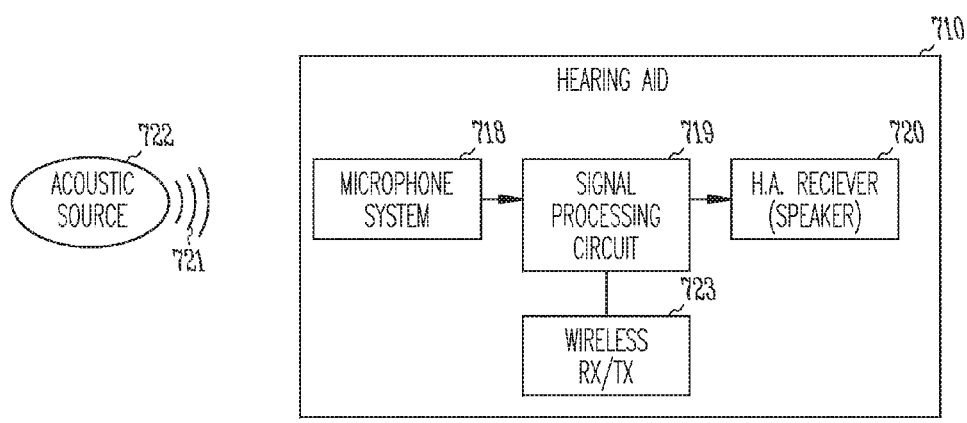
FIG. 7 illustrates a block diagram of a hearing aid embodiment.

FIG. 7 illustrates a block diagram of a hearing aid embodiment. The illustrated hearing aid 710 includes a microphone system 718, a signal processing circuit 719 which may be incorporated as part of a controller, and a speaker 720 referred to as a hearing aid receiver. The microphone system 718 transforms the acoustic energy 721 of sound from an acoustic source 722 into a signal representative of the sound. The signal processing circuit 719 receives the signal from the microphone system 718, and is designed (e.g., programmed) to appropriately adjust the signal to compensate for the hearing impairment of the wearer of the hearing aid. The signal processing circuit 719 outputs a processed signal to the hearing aid receiver 720, which converts the processed electrical signal into a sound perceived by the wearer. The illustrated hearing aid embodiment also includes a wireless communication circuit 723 configured to transmit and/or receive wireless signals. The wireless communication circuit may include a receiver, a transmitter, or a transceiver. The signal processing circuit 719 (or controller) controls the wireless communication circuit 723 to control the wireless communication with other devices.

Figure 8:
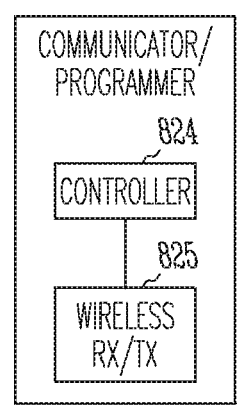
FIG. 8 illustrates a block diagram of the communicator, such as a programmer.

FIG. 8 illustrates a block diagram of the host wireless communicator, such as a programmer. The illustrated communicator includes a controller 824 and a wireless communication circuit 825 configured to transmit and/or receive wireless signals. The wireless communication circuit may include a receiver, a transmitter, or a transceiver. The controller 824 controls the wireless communication circuit 825 to control the wireless communication with other devices. The station can include other elements, such as various input/output devices like a display monitor, keyboard and mouse.

Figure 9:
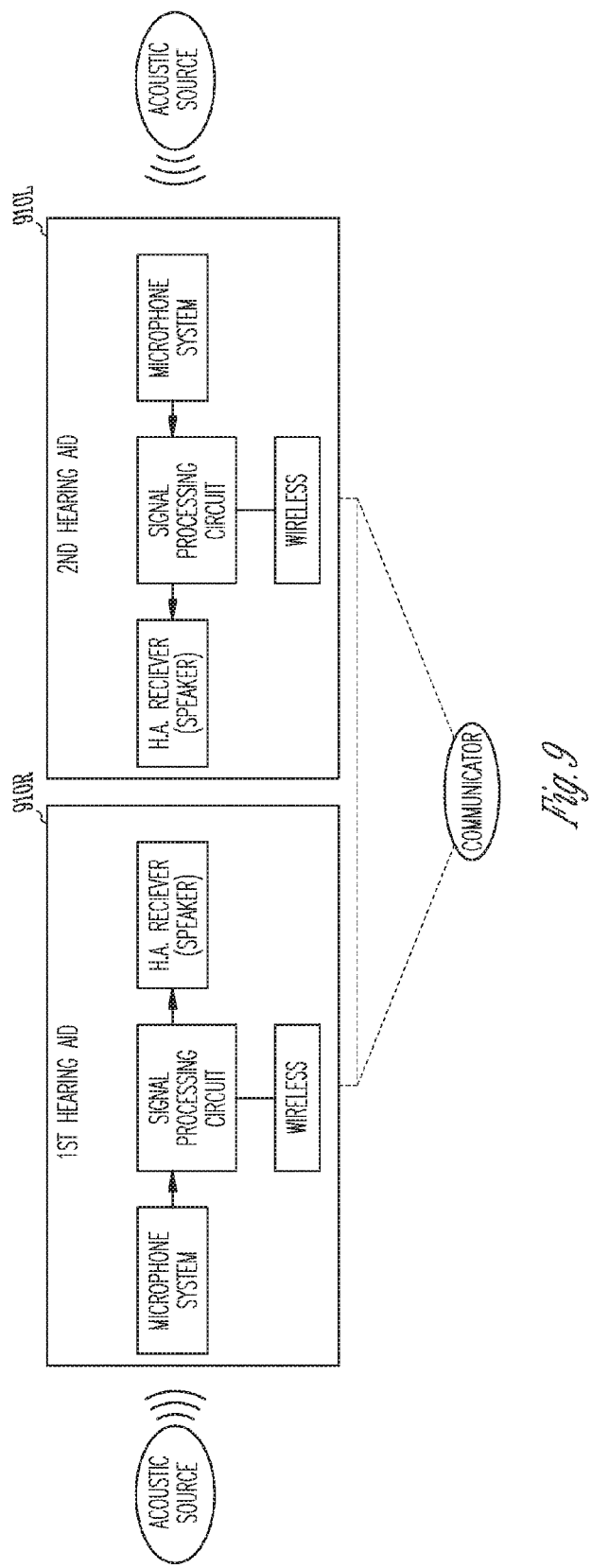
FIG. 9 illustrates a wireless communication system embodiment.

FIG. 9 illustrates a wireless communication system embodiment. The illustrated system includes a number of devices configured to wirelessly communicate with at least one other device in the system. The devices in the system illustrated in FIG. 9 include a host communicator such as illustrated in FIG. 8, and further include first 910R and second 910L hearing aids, such as illustrated in FIG. 7 and as may be simultaneously worn to assist hearing in a person's right and left ears. As illustrated by the dotted lines in FIG. 9, the communicator is configured to wireless communicate with both hearing aids, the first hearing aid is configured to wirelessly communicate with the second hearing aid and the communicator, and the second hearing aid is configured to wirelessly communicate with the first hearing aid and the communicator. The communication signals may include data and/or audio. Examples of data include programming instructions, device diagnostics, and link quality information. Examples of audio include digital audio or compressed digital audio.

Figure 10A:
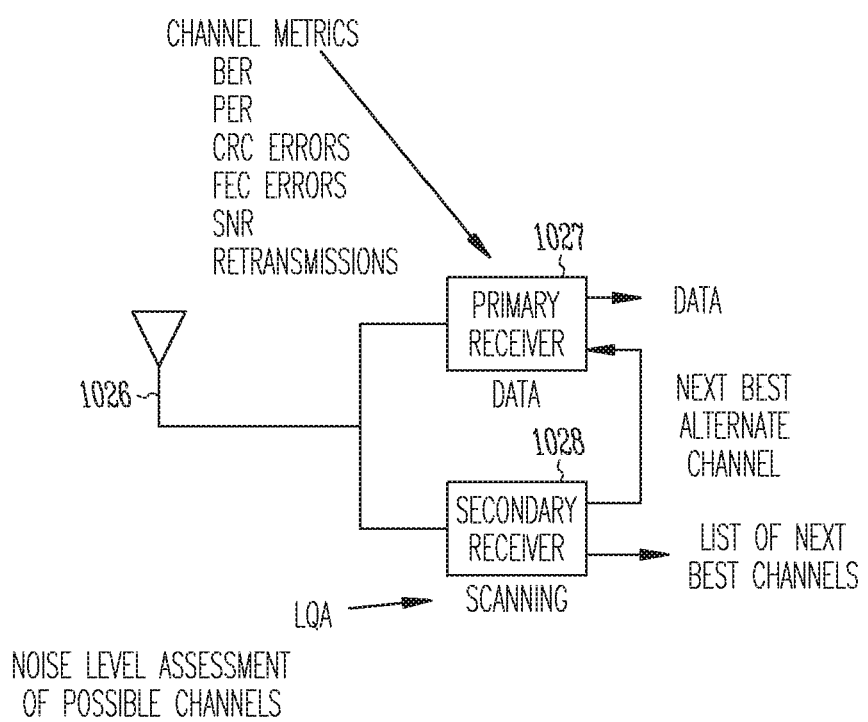
FIGS. 10A-10B illustrate device embodiments with primary and secondary receivers.
Figure 10B:
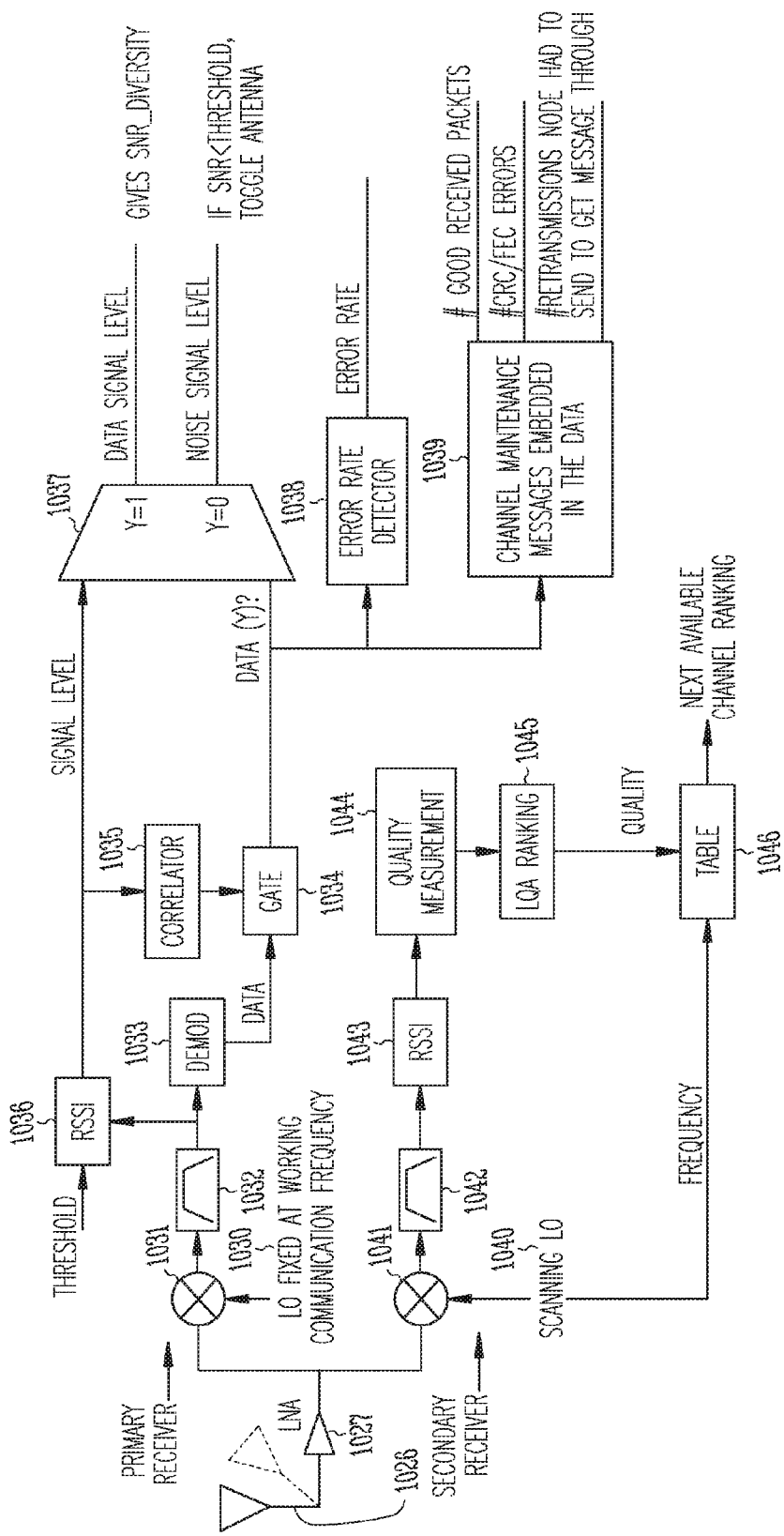

FIGS. 10A-10B illustrate device embodiments with primary and secondary receivers. FIG. 10A illustrates a device embodiment with an antenna 1026, and a primary receiver 1027 and a secondary receiver 1028 connected to the antenna. The antenna can include spatially-diverse antennas, an antenna with diverse polarities, or spatially-diverse antennas with diverse polarities. The primary receiver 1027 receives a data communication using the antenna, and the secondary receiver 1028 scans other possible communication channels to assess the link quality of these other channels in anticipating of switching the channel used by the primary receiver. In the illustrated embodiment, the secondary receiver 1028 provides a list of next best channels, and provides the primary receiver with the next best alternate channel. The primary receiver 1027 receives the data communication through a channel, monitors channel metrics indicative of channel quality for the channel used to receive the data. Examples of channel metrics include bit error rate (BER), packet error rate (PER), cyclic redundancy check (CRC) errors, forward error correction (FEC) errors, signal to noise ratio (SNR), and the number of retransmissions.

FIG. 10B provides a more detailed illustration of a device embodiment with an antenna 1026, and primary and secondary receivers. The illustrated antenna 1026 is a spatially diverse antenna and/or has diverse polarities. A received signal passes through a low noise amplifier (LNA) 1029, and then passes to both a primary and a secondary receiver.

The primary receiver includes a local oscillator (LO) 1030 which is programmed to oscillate at a frequency necessary for communications. A mixer 1031 multiplies the signal from the LNA with the signal from the LO 1030, and outputs the resulting modulated signal to a bandpass filter 1032. A demodulator 1033 demodulates the modulated signal to provide the data from the signal to a gate 1034 and to a correlator 1035. The modulated signal is also presented to a Receive Signal Strength Indicator (RSSI) module 1036 that compares the strength of the received signal to a threshold and outputs the signal level to the correlator 1035. The correlator controls the timing of the received signal level and the received data to allow the data to pass through the gate when the signal level is above the RSSI threshold and when a correlation word is received. A multiplexer 1037 outputs a data signal level when data is received (Y=1) and outputs a noise signal level when data is not received (Y=0), which are used to determine a signal to noise ratio (SNR). The SNR can be used to change the diverse antenna. For example, an antenna currently being used can be exchanged for a spatially-diverse antenna and/or a polarity of an antenna can be changed. The SNR measurement can be used to switch to an alternate channel. If the SNR is less than a threshold, the next best alternate channel is used for the data transmission. The data passed through the gate can be presented to an error rate detector 1038 which can determine the error rate on a bit or packet basis, and can be presented to a module 1039 to extract channel maintenance messages embedded in the data. Examples of channel maintenance messages include the number of good received packets, the number of CRC errors, the number of FEC errors, and the number of retransmissions sent by a node. This information can also be used to determine when to change the diverse antenna and/or change channels.

The secondary receiver includes a scanning local oscillator (LO) 1040 that scans frequencies corresponding to available channels. A mixer 1041 multiplies the signal from the LNA with the signal from the scanning LO 1040, and outputs the resulting modulated signal to a bandpass filter 1042. A Receive Signal Strength Indicator (RSSI) module 1043 measures the strength of the received signal and outputs the signal level to quality measurement module 1044 configured to monitor the quality of potential communication channels based on noise levels. An LQA ranking module 1045 ranks the available channels based on their link quality (e.g., channels with lower noise rank higher than channels with higher noise). A table 1046 is used to store entries with frequencies of available channels, along with a quality rank for each entry. The table can be used to provide the highest ranking channel as the next available channel to replace the current working communication frequency in the primary receiver. The channel quality metric is formed using both a peak detector and an RMS detector.

Figure 11:
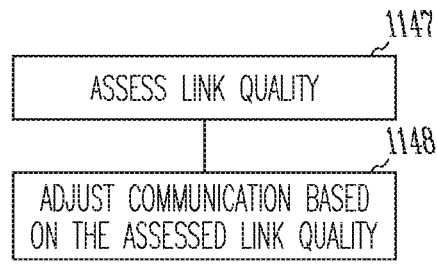
FIGS. 11-13 illustrate embodiments of methods for managing wireless communication links.

FIG. 11 illustrates a method for managing wireless communication links according to various embodiments of the present subject matter. The link quality of a wireless communication link is assessed at 1147, and the wireless communication is adjusted at 1148 based on the assessed link quality.

Figure 12:
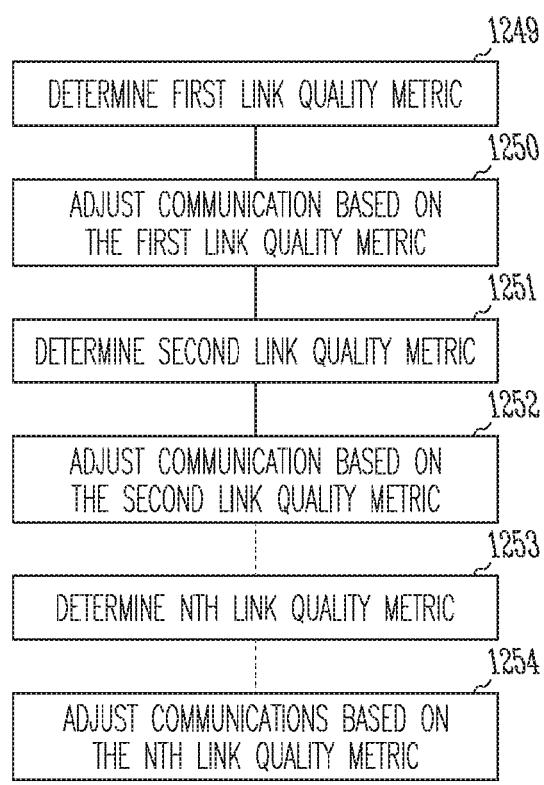

FIG. 12 illustrates a method for managing wireless communication links according to various embodiments of the present subject matter. A first link quality metric is determined at 1249; and at 1250, communication is adjusted based on the first link quality metric. A second link quality metric is determined at 1251; and at 1252, communication is adjusted based on the second link quality metric. Some embodiments continue this determination and adjustment to an nth time, such that an nth link quality metric is determined at 1253; and at 1254, communication is adjusted based on the nth link quality metric. The determination of a link quality metric (e.g. 1249, 1251, or 1253) can be based on an assessment of one or more aspects of the communication link, and the assessment(s) of the aspect(s) of the communication link can be performed simultaneously or according to various sequences. By way of example, and not limitation, an embodiment determines a first link quality metric by assessing the signal strength on the channel, a second link quality metric by assessing a signal to noise ratio, and a third link quality metric by assessing the combination of signal to noise ratio, error rate, and a number of retransmissions being required for sending a packet.

Figure 13:
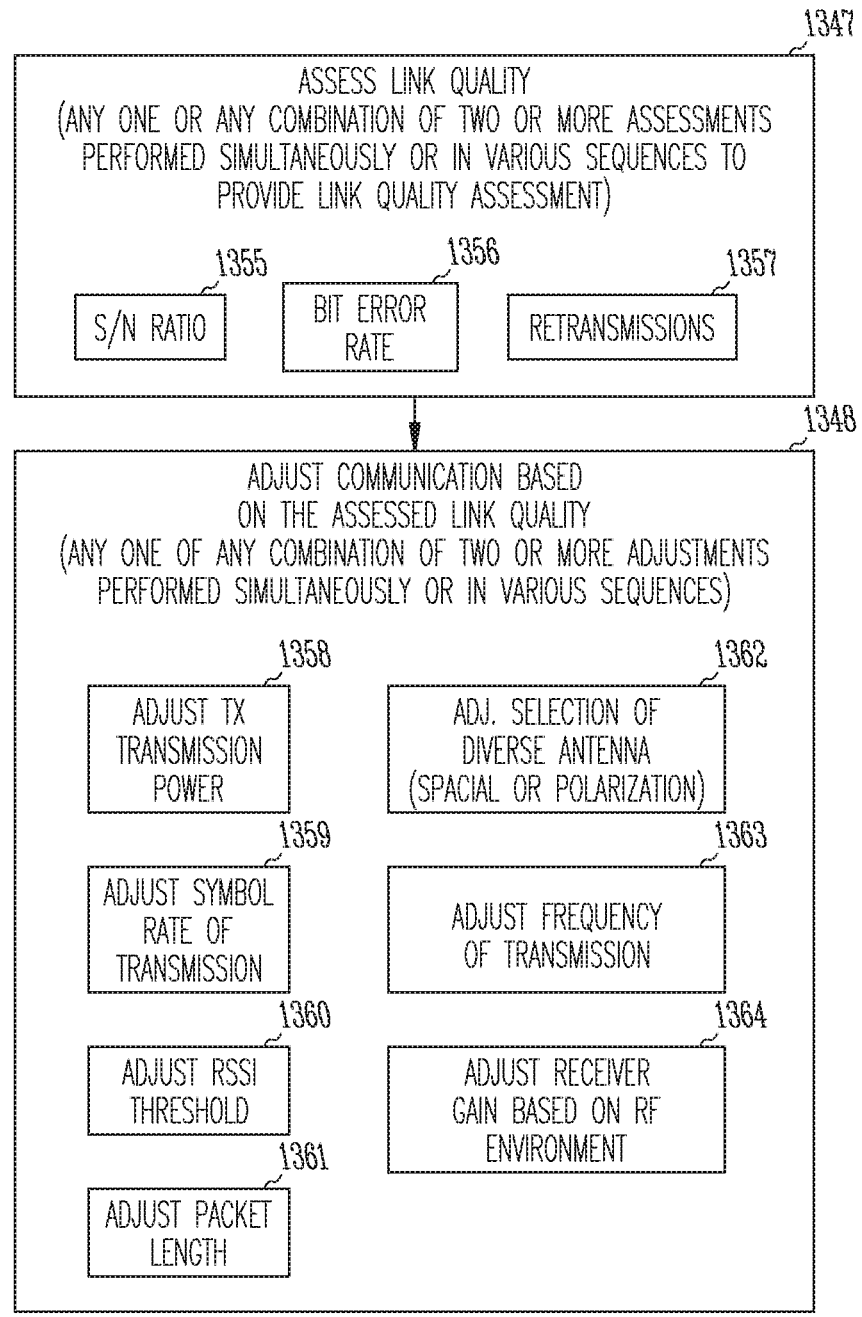

FIG. 13 illustrates a method for managing wireless communication links according to various embodiments of the present subject matter. The link quality of a wireless communication link is assessed at 1347, and the wireless communication is adjusted at 1348 based on the assessed link quality. According to various embodiments, the link quality of a wireless communication link is assessed using a signal to noise ratio for a link 1355, a bit error rate for the link 1356, a number of retransmissions for a link over a period of time 1357, or various combinations thereof. The figure illustrates some examples of ways to assess the current communication channel's link quality. Any one or any combination of assessments may be performed simultaneously or in various sequences to provide a link quality assessment. LQA is discussed in further detail below. According to various embodiments, adjusting wireless communication includes adjusting transmission power 1358, adjusting a symbol rate of transmission 1359, adjusting a Receive Signal Strength Indicator (RSSI) threshold 1360, adjusting a packet length 1361, adjusting selection of a diverse antenna 1362 (e.g. spatially-diverse and/or diverse in polarity), adjusting a transmission frequency (channel hopping) 1363, and adjusting receiver gain based on RF environment detected across all or a subset of available channels 1364. It is understood that in various embodiments, adjustments may be done outside of during channel maintenance times. For example, in various embodiments a channel change may be performed when a packet is not acknowledged for a number of retries, which may be performed outside of a maintenance interval. Other adjustments are possible and those provided herein are not intended to be exhaustive or limiting.

Link Quality Assessment (LQA)

Battery-powered remote devices that function as hearing assistance devices (e.g., hearing aids) transmit with limited power, such that, as seen by the receiver of the transmission (e.g., communicator or other hearing aids), the transmission is near the noise floor of the occupied channel. Communication with low power devices, having little power available for transmit, will have minimal link margin. A high data throughput can be achieved using a low power RF link when the link is of good quality. However, multi-path fading, interference, body and head shadowing, and increased range potentially impair the link.

An assessment of link quality for a wireless communication channel can be made by assessing noise in the channel, or signal strength in the channel, or a signal to noise ratio for the channel, or a bit error rate, or a packet error rate, or the number of retransmissions, or various combinations thereof.

Wireless Communication Adjustments Based on LQA

The present subject matter uses LQA information, also referred to herein as channel metrics, for wireless communication channels to manage and make adjustments to the wireless communication.

Power

Various embodiments of a wireless communication system with hearing aid nodes use variable power levels for the transceiver based on channel quality metrics. Some embodiments use link quality metrics to control transmit RF power of devices using the link for communicating to, from or between hearing aids. Some embodiments use link quality metrics to control receiver input power consumption (e.g., receiver gain vs. linearity) for devices communicating to, from, or between hearing aids. Some embodiments automatically control gain of the receiver based on the RF environment (see, for example, US 2007/0110193 entitled Automatic Gain Control With Out Of Band Blocking Signal Compensation, which is incorporated by reference in its entirety).

A decision metric is used to change power levels used on a wireless communications channel. Various embodiments employ adaptive transmit and receive power levels based on several channel metrics to improve power consumption and the link margin of the overall system. At any time during the communication session, the system may change transmit power levels or reduce the receiver power based on channel metrics used to assess link quality.

If the link from a station to a hearing aid (downstream link) is good, the station can lower its output power based on downstream link quality metrics in order to reduce its power consumption and potential interference with other such devices within range. The hearing aid may decide to lower its receiver gain and or linearity to conserve power when the downlink from the station is above an acceptable level of performance. If the link from the hearing aid to the station is good, the station may command the hearing aid to lower its transmission output power to improve the overall battery life of the hearing aid. If the link is poor, power may be increased to the extent permitted by power constraints for the device and system design to improve link margin.

If it is determined that the channel has a poor link quality, various embodiments increase RF power to maintain the link while maintaining the overall information throughput, various embodiments reduce the gain and linearity of the hearing aid's receiver to reduce the overall power consumption of the hearing aid when the link is of sufficient quality to warrant a reduction in receive performance.

Symbol Transmission Rates

Various embodiments of a wireless communication system with hearing aid nodes use various symbol rates based on channel quality metrics. A decision metric is used to change symbol rates a wireless communications channel employed for use with a hearing communication device. Various embodiments employ lower/higher symbol rates based on one or more channel metrics to improve the link margin of the overall system. At any time during a communication session, the system may change symbol rates based on channel metrics used to assess link quality.

Several methods for changing the symbol rate may be employed. For example, some embodiments employ a binary set of frequency shift key (FSK) symbols that alternate at the symbol rate. These symbols which control the symbol rate can be contained in the preamble, the sync word, or the message body. The receiver can then adapt its data recovery and pre and post detection filtering based on the symbol rate of the preamble, the sync word or the message body. If it is determined that the channel has a poor link quality, various embodiments reduce the symbol rate to maintain the link while lowering the overall throughput. If the channel's link quality is good or has improved, the symbol rate will increase to the extent permitted for the link quality.

Receive Signal Strength Indicator (RSSI) Threshold

A packet receive state machine in a receiver uses a RSSI threshold to determine the start of a packet transmission. Various embodiments of a wireless communication system with hearing aid nodes use an adaptive RSSI threshold. A decision metric is used to change the RSSI threshold on the packet receive state machine used on a wireless communications channel employed for use with a hearing communication device. The receiver state machine employs an RSSI threshold detector, a carrier recovery circuit, a timing recovery circuit, and a sync word correlator to determine the start of a packet reception.

Because the power-limited hearing aid transmits near the noise floor, the receiver (e.g., station) sets the RSSI threshold very close to the noise floor of the receiver but sufficiently high to avoid false detection on noise. If the receiver falsely identifies noise as a communication signal, the noise starts the receiver state machine which may make incorrect decisions on carrier and timing recovery (false detects) which will then prevent the actual packet from being optimally decoded by the receiver. These false detects can be avoided by setting the RSSI threshold appropriately above the noise floor of the receiver.

Since the system uses an unlicensed band, various sources of interference may appear from time to time on the channel of interest. These interferers cause the noise floor of the channel to vary with time. To account for this, various embodiments use an adaptive RSSI threshold to increase link margin (if available) in receiving a packet from a low powered remote hearing instrument. Various embodiments adjust this threshold more or less continuously and set the threshold during periods of non-packet activity on the channel, usually prior to or just after a packet is received. Some embodiments measure RSSI on a per packet basis and set the threshold as high as practical based on the quality of the link using RSSI values attained during and between packet receptions.

If at any time during the session, the system may change the RSSI threshold based on based on channel metrics used to assess link quality. In addition to determining if the error rate falls below an acceptable level or the number of transmissions rises above an acceptable level, the RSSI can be deemed unacceptable for reliable communication based on the level of signal strength as measured in between packet receptions (quiet times), based on the level of signal strength as measured during packet reception, or where the signal to noise ratio has improved or been reduced, a combination of signal strength as measured in between packet receptions (quiet times) and as measured during packet reception.

For example, a station or programmer embodiment performs a channel maintenance algorithm, and adjusts the RSSI threshold for receiving a packet based on the number of retransmissions attempts and the number of checksum errors counted since the last channel maintenance window. If the number of errors and retry attempts indicate a packet error rate higher than 12%, for example, the programmer monitors the channel's noise floor to adjust the RSSI threshold.

Packet Length

Various embodiments of a wireless communication system with hearing aid nodes use various packet lengths based on channel quality metrics. A decision metric is used to change packet lengths a wireless communications channel employs for use with a hearing communication device.

Various embodiments employ shorter/longer packet lengths based on one or more channel metrics to improve the link margin of the overall system. At any time during a communication session, the system may change packet lengths based on channel metrics used to assess link quality. If it is determined that the channel has a poor link quality, various embodiments shorten the packet length. If the channel's link quality is good or has improved, various embodiments lengthen the packet length to the extent permitted for the link quality.

Diverse (Spatial/Polarity) Antenna

Various embodiments of a wireless communication system with hearing aid nodes use diverse antenna(s), and change the diverse antenna(s) based on channel quality metrics. For spatially-diverse antennas, the current antenna can be switched with another antenna. For an antenna with diverse polarities, the polarity of the antenna can be switched. A decision metric is used to change/combine antennas used on a wireless communications channel employed for use with a hearing communication device.

In an indoor environment there are many sources of radio frequency reflections that cause multi-path signal arrivals at the antenna that may cause fading of the channel which effect the bit error rate or packet error rate of the system. Multi-path effects serve to enhance or destroy the signal link between the programmer and the hearing instrument. A diversity antenna system employing both polarization and spatial diversity can help to enhance the link. Even body shadows that may affect the main line of sight path may be mitigated by a random multi-path reflection from the ceiling or nearby wall. By employing a diversity antenna, the system improves the chances of intercepting a signal from the ceiling, floor, or nearby wall that is not impaired by body shadowing effects or even other interference.

Some embodiments choose on a per packet basis the best antenna to employ based on the best signal level or signal to noise ratio as measured during the preamble of the signal. Some embodiments demodulate the signal from two or more receiver/antenna pairs and keep the packet with the least errors or no errors. Some embodiments choose one of two or more antennas based on channel metrics such as receive signal strength, packet checksum errors, packet forward error correction errors, packet retransmission attempts. If at any time during the communication session, the system changes antennas based on channel metrics used to assess link quality.

For example, various station/programmer embodiments perform a channel maintenance algorithm. After the programmer tries to adapt the RSSI threshold, the programmer switches, based on the assessed link quality, to the opposite polarity antenna to determine if a null due to multi-path or undesirable antenna orientation can be mitigated using another antenna polarization or a spatially-diverse antenna. The switch can be based on the number of retransmissions attempts and the number of checksum errors counted since the last channel maintenance window. Should the number of errors and retry attempts indicate a packet error rate higher than 10%, for example, over the channel maintenance window, the programmer switches the antenna just prior to station maintenance. Some embodiments do not switch the antennas unless both nodes have acknowledged recent station maintenance messages containing the same alternate channel information. This way if the link is lost following diversity antenna switching, the nodes will rendezvous on the alternate channel together.

Transmission Frequency (Adaptive Frequency Hopping)

Various embodiments of a wireless communication system with hearing aid nodes adjust transmission frequencies based on channel metrics. This is referred to as adaptive frequency hopping (AFH) or channel hopping. Some system embodiments use a secondary "look ahead" receiver to select a desirable channel that is not corrupted by interference. Some system embodiments select a good channel using a primary receiver that time multiplexes its task of communication with a remote device and looking ahead for a good channel within the bandwidth. Some system embodiments use a Fast Fourier Transform (FFT) analysis to simultaneously evaluate all potential narrow band channels for potential use by a primary narrow band transceiver. Some system embodiments use a FFT analysis to look ahead at all potential channels while simultaneously communicating with a narrow band remote transceiver.

At any time during the communication session, the system may change channels based on channel metrics used to assess link quality for the current channel and for available channels. Because of the low power nature of the remote transceivers and the availability of a limited bandwidth resource, some embodiments use narrow band channels with time division multiple access and a listen before talk algorithm that allow frequency reuse with various other services.

A secondary receiver monitors the usage of an unlicensed band to pick a desirable channel for communicating information to and/or from a power-limited device. A primary transceiver communicates with a remote device using narrow band channels using a modulation scheme sufficient to convey information to and/or from a remote device. The primary receiver picks a desirable channel to use based on a channel metric found and stored by the secondary receiver that is continuously scanning the entire available bandwidth looking for adequate channels for communication to the remote devices. The secondary receiver uses a bandwidth that is substantially the same as the primary receiver so that a good assessment can be made of how that channel would perform when used for communication by the primary receiver.

If the channel is corrupt then the primary receiver within the base station will not be able to receive the remote signal and information cannot be conveyed in the uplink. The down link transmission from the station to the hearing aid does not have the same power restrictions since the base unit has more power available and is restricted only by the regulations governing the output power within the unlicensed band. Armed with this knowledge the base station unit can make certain assumptions about the downlink. For instance based on the link quality assessment (LQA) made by the primary receiver or the secondary receiver it may or may not assume that the remote device can hear its signal. In most cases the downlink is robust enough to assume that a command can be received by the remote device even if the remote device cannot acknowledge its receipt. In this way the base station primary transmitter can command the remote device to move or "hop" to a different channel within the unlicensed band determined by the LQA made of all other possible channels within the unlicensed band by the secondary receiver. Once the command is made to send the remote to another viable channel the confirmation of the frequency change command can be made with the remote device on the new channel.

Various embodiments use a metric that involves both a peak and average detector. Channels that exhibit low peaks as well as low average values will show up as a high score and are a desirable channel for wireless communication. Channels having high peaks but low averages may work well for a listen-before-talk time division multiple access system, and thus receive a medium score. The system prefers to use a channel with a high score, but can use a channel with a medium score. Channels occupied by continuous narrow band signals will have a high average receive signal strength and would show up as a poor score. Several metrics can be formed using an assigned weight. Examples of metrics include: $M_{chan}=W_1*RSSI_{avg}+W_2(RSSI_{peak})$; and $M_{chan}=(RSSI_{avg}+RSSI_{peak}) RSSI_{avg}$. A higher weight is assigned to the average received signal strength than to the peak since Time Division Multiplex (TDM) and Listen Before Talk (LBT) systems may be able to be used.

For example, various station/programmer embodiments perform a channel maintenance algorithm. After the programmer tries to adapt the RSSI threshold and switch the antenna polarization, the programmer commands the hearing aid to channel hop to the next best channel taken from the LQA data of available channels. This channel hop is based on the assessed link quality (e.g., the number of retransmissions attempts and the number of checksum errors counted since the last channel maintenance window). Should the number of errors and retry attempts indicate a packet error rate higher than 22%, for example, over the channel maintenance window, the programmer can either command the hearing instrument to change channels using a channel change message or alternatively stop sending channel maintenance messages which will force the node to change channels.

If a single node is lost (no longer responding to channel maintenance messages), it can be assumed to have changed channels to the alternative channel that was last acknowledged by the node during a previous channel maintenance message. Because the nodes are vulnerable to falling out of range or being interfered with, various embodiments maintain the same alternate channel unless the alternate channel, based on current LQA information, is severely degraded from its initial quality assessment.

Receiver Gain in Hostile RF Environment

Some device embodiments are equipped with a secondary receiver that can be employed to access the quality of the available channels. According to some embodiments, this secondary receiver is also equipped to access the overall RF power in the band of operation. If the overall power across the band is above a certain threshold then the environment can be considered "hostile" for communications between devices. Some embodiments reduce the front end gain of the receiver to prevent overload. The reduced front end gain allows the communications link to be maintained at a reduced range of operation. For example, a reduced front end gain in some embodiments still allows communication over a distance on the order of 1.5 meters. Without this change in front end receiver gain a hostile RF environment allows the receiver to become over-loaded by the hostile RF environment.

Various embodiments reduce one or more of the AGC_Gain, AGC_Max Gain or the AGC_Search_Gain parameters of the receiver. Some embodiments determine a LQA score for each available channel that is not currently being used for communication, and then sums the LQA scores for all of these channels that are not currently being used. The United States, for example, in one embodiment has 28 available channels. If one of the channels is being used for communication, the LQA score of the remaining 27 channels is summed and compared to a threshold. In another embodiment, four channels are available in the European Union. If one of the channels is being used in the European Union, the LQA score of the remaining 3 channels is summed and compared to a threshold. If the sum of the LQA scores exceeds a threshold for lowering gain, then the receiver gain is lowered. Some embodiments lower the gain by one incremental value (e.g., on the order of 4 dB from nominal gain). The nominal gain for a band, such as within the United States, is determined during device calibration and is stored along with other band information in non-volatile memory. In one embodiment the threshold score will be given by $T*(N-1)$ where N is the number of channels being scanned minus one (the channel in use). Where T will be the based on a factory calibration or a general metric of the compression point of the receiver.

Figure 14:
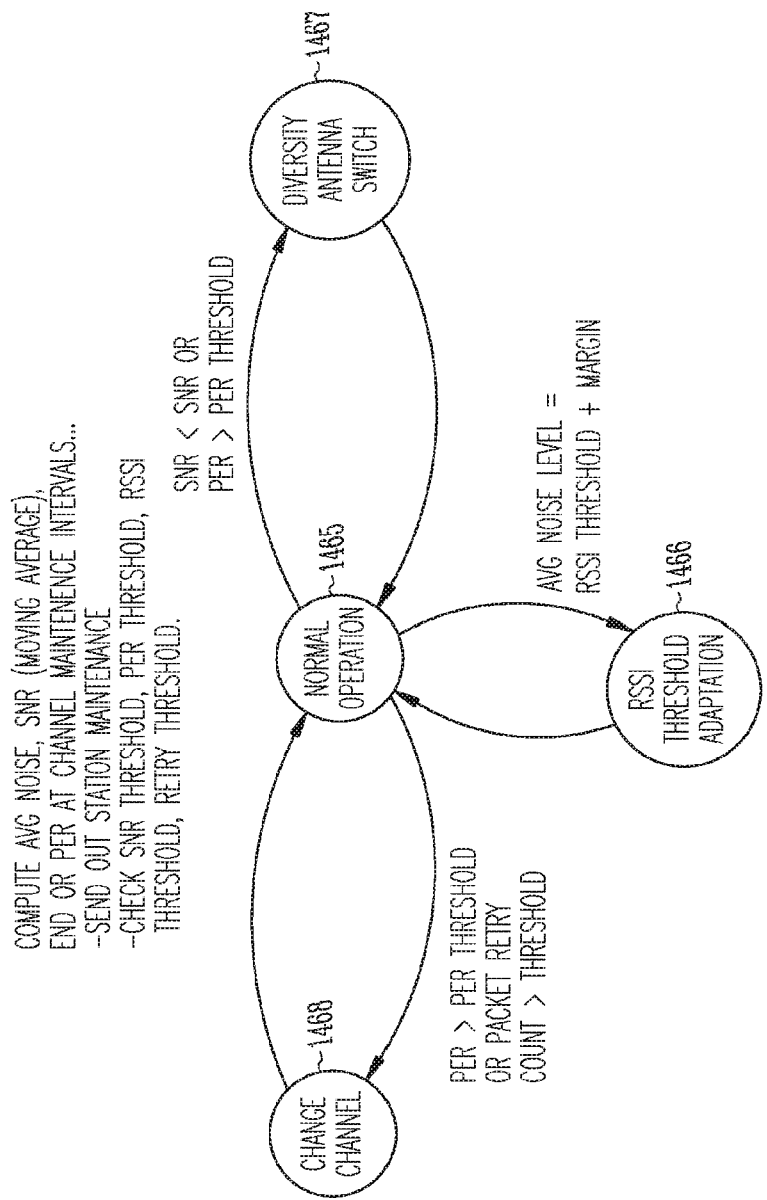
FIG. 14 illustrates a state diagram of an embodiment of a process performed by a station to maintain link quality.

FIG. 14 illustrates a state diagram of an embodiment of a process performed by a communicator to maintain link quality according to one embodiment of the present subject matter. The normal operation occurs at state 1465. During normal operation, the average noise, signal-to-noise ratio (SNR), and packet error rate (PER) are computed periodically. The period of time in which certain variables are computed is known as a "channel maintenance interval". At the conclusion of a channel maintenance interval, some of the parameters are evaluated against corresponding thresholds such as PER and BER. If the PER is greater than the PER threshold, the station changes channels as illustrated at state 1468. In some embodiments, if the PER is greater than the PER threshold, the station adjusts a diversity antenna switch as illustrated at state 1467. In some embodiments, the station may first adjust the diversity antenna switch, re-evaluate the PER and then change channels if the PER is still greater than the PER threshold. If the SNR is less than the SNR threshold, the station adjusts a diversity antenna switch as illustrated at state 1467. In the embodiment of FIG. 14, if the average noise is not equal to the RSSI threshold plus a margin, the control adapts the RSSI threshold as illustrated at state 1466. IN some embodiments, if the packet retry count exceeds a packet retry count threshold, the station changes channels as illustrated at state 1468.

Other embodiments assess the link quality using a different order. Still other embodiments use different techniques to assess link quality, such as based on signal strength, environmental noise strength, signal to noise ratio, and retransmission counts. Various combinations of the different means for assessing link quality can be used. The different methods for assessing link quality can be performed in a number of different orders. The state diagram illustrated in FIG. 14 is provided as an example. Additionally, the process illustrated in the state diagram of FIG. 14 can be implemented in a variety of devices, including communicators and hearing assistance devices.

Bluetooth Low Energy Devices

Bluetooth low energy (BLE) is a distinguishing feature of Bluetooth version 4.0 wireless communication technology that provides low-power devices with short-range low-power wireless connectivity. Examples of such low-power devices include hearing assistance devices, such as hearing aids. Each device having wireless connectivity, as discussed in this document, may be a device equipped with BLE-based communication capability (referred to as a "BLE device" herein). In other words, BLE technology may be implemented in each of the hearing assistance devices 101A-D and the communicators 102A-D as illustrated in FIGS. 1A-D, the communicators 202 and 302, the programmer, the hearing assistance device, the assisted listening device, the streaming audio device, and the wireless audio controller (WAC) as illustrated in FIGS. 2A-E and 3A-E, the WAC 405 and the hearing assistance devices as illustrated in FIG. 4, the hearing aid device 510, the programmer 512, the assisted listening systems 513, the device 541 that provides encoded and compressed audio, the remote control device 515, and the other hearing aid 516 as illustrated in FIG. 5, the hearing aids 610 and programmer 612 as illustrated in FIG. 6, the hearing aid 710 as illustrated in FIG. 7, the communicator/programmer as illustrated in FIG. 8, and the hearing aids 910R-L and the communicator as illustrated in FIG. 9, among other devices discussed in this document. BLE communication may be performed between the BLE devices. Wireless test modes (also referred to as RF test modes) are generated for design verification and manufacturing test with such devices when implemented as BLE devices. Various embodiments use the same wireless test modes in the field to characterize an environment where problems occur with the BLE communication between such devices.

The Bluetooth protocol for low energy provides a test mode that requires a wired human-computer interface (HCI) between a Bluetooth tester and a Device Under Test (DUT). The wired HCI may include a cable connecting the DUT to the Bluetooth tester. The present subject matter provides wireless test to the BLE protocol.

The BLE protocol includes Direct Test Modes which are normally used for testing a physical layer link between a BLE device and a Bluetooth tester. These commands are normally accessed through a 2-wire UART interface, but they can also be accessed through HCI commands. Bluetooth does not support wireless test modes as part of the BLE.

The present subject matter provides BLE hearing assistance devices such as hearing aids with wireless test modes. Various embodiments include includes one or more wireless test modes that do not require a wired interface such as the cable, thereby making the testing more efficient and enabling diagnostic testing in the field. Various embodiments include such BLE wireless test capability built into a hearing assistance device such as hearing aid and/or a device communicating with the hearing assistance device for the BLE protocol. In various embodiments, devices with such built-in test capability are each capable of performing a self-test of wireless communication functionalities. In various embodiments, the wireless (RF) test modes include the Direct Test Modes, as referred to as Non Link test modes, which verifies functionality of the physical layer link between a BLE DUT and a BLE tester.

Figure 15:
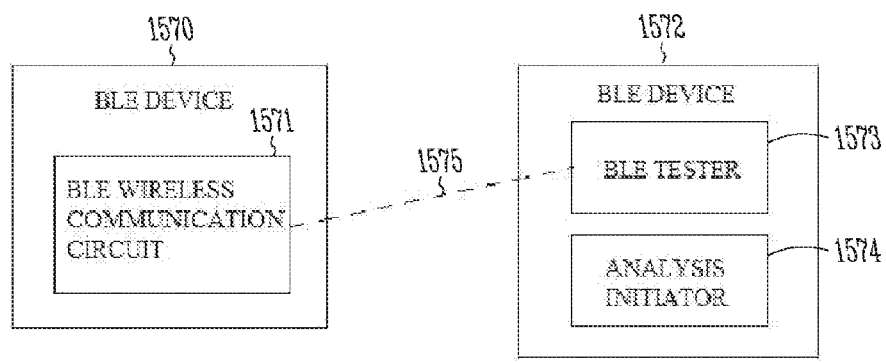
FIG. 15 illustrates a block diagram of Bluetooth Low Energy (BLE) device embodiment.

FIG. 15 illustrates a block diagram of Bluetooth Low Energy (BLE) device embodiment. A system includes two or more BLE devices configured to communicate with each other using BLE wireless communication technology. The illustrated embodiment includes a first BLE device 1570 and a second BLE device 1572 communicatively coupled to each other via a wireless link 1575. The BLE device 1570 includes a BLE wireless communication circuit 1571 configured to receive and transmit data using BLE wireless communication technology. The BLE device 1572 includes a BLE tester 1573 configured to wirelessly communicate with the BLE device 1570 and test the BLE wireless communication circuit 1571 according to a wireless test mode in response to a test command associated with the wireless test mode. In various embodiments, the system can include any number of devices each including at least one of the BLE wireless communication circuit 1571 and the BLE tester 1573. In the illustrated embodiment, the BLE device 1572 includes an analysis initiator 1574 configured to generate the test command in response to a signal requesting a diagnostic analysis of an environment of the wireless communication. In various embodiments, the signal requesting the diagnostic analysis may be originated from a user or a device. In various embodiments, at least one of the BLE device 1570 and the BLE device 1572 is a hearing aid.

In various embodiments, the link quality management device (LQM) as illustrated in FIGS. 1B-D includes a BLE tester capable of performing tests under the wireless test mode, such as the BLE tester 1573. Each BLE device discussed in this document, including each hearing assistance device, hearing aid, communicator, programmer, assisted listening device, streaming audio device, WAC, device that provides encoded and compressed audio, remote control device, may be configured to include the built-in BLE wireless test capability, i.e., configured to be one of the BLE devices 1570 and 1572 as discussed in this document or similar devices. In various embodiments, each of these devices may be configured to function as a device under test and/or a tester operating under the BLE wireless test mode.

The BLE tester 1573 represents an embodiment of the link quality management device (LQM) as illustrated in FIGS. 1B-D. In various embodiments, the BLE tester 1573 is configured to assess a link quality for the wireless communication channel between the BLE tester 1573 and the BLE wireless communication circuit 1571 and provide channel metrics indicative of the assessed quality for the wireless communication channel. In various embodiments, the BLE tester 1573 is further configured to adjust wireless communication over the wireless communication channel using the channel metrics for the wireless communication channel.

The BLE tester 1573 produces at least one metric indicative of quality of data transmission performed via the wireless link 1575 using the BLE wireless communication circuit 1571. In various embodiments, the wireless link 1575 includes a plurality of wireless communication channels, and the BLE tester 1573 produces at least one channel metric indicative of quality of data transmission performed via each channel of the plurality of wireless communication channels using the BLE wireless communication circuit 1571. Examples of channel metric include bit error rate (BER), packet error rate (PER), cyclic redundancy check (CRC) errors, forward error correction (FEC) errors, signal to noise ratio (SNR), number of retransmissions, and Receive Signal Strength Indicator (RSSI). In one embodiment, the BLE tester 1573 produces a channel map indicative of quality of data transmission using each channel of the plurality of wireless communication channels.

Figure 16:
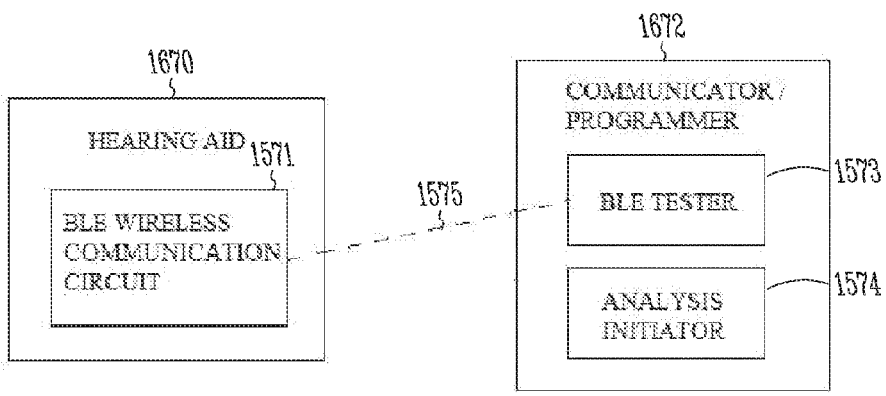
FIG. 16 illustrates a block diagram of BLE hearing aid embodiment.

FIG. 16 illustrates a block diagram of BLE hearing aid embodiment in which the BLE device 1570 is a hearing aid 1670 and the BLE device 1572 is a communicator/programmer 1672. The hearing aid 1670 is battery-operated and includes at least a microphone, a receiver, and signal processing circuitry, in addition to the BLE wireless communication circuit 1571. In various embodiments, any hearing aid devices discussed in this document, including but not limited to the hearing aids 510, 610, 710, and 910R-L, may be implemented as the BLE hearing aid 1670.

The communicator/programmer 1672 is configured to communicate with hearing aid 1672 via wireless link 1575. In various embodiments, the communicator/programmer 1672 may include a communicator that is capable of testing and diagnosing performance of data transmission over the wireless link 1575 and/or a programmer that is capable of adjusting settings of the hearing aid 1672 including parameters controlling the operation of the BLE wireless communication circuit 1571. In various embodiments, any communicator/programmer devices discussed in this document, including but not limited to the communicators 102A-D, 202, and 302 and the programmer 512, may be implemented as the BLE communicator/programmer 1672.

Figure 17:
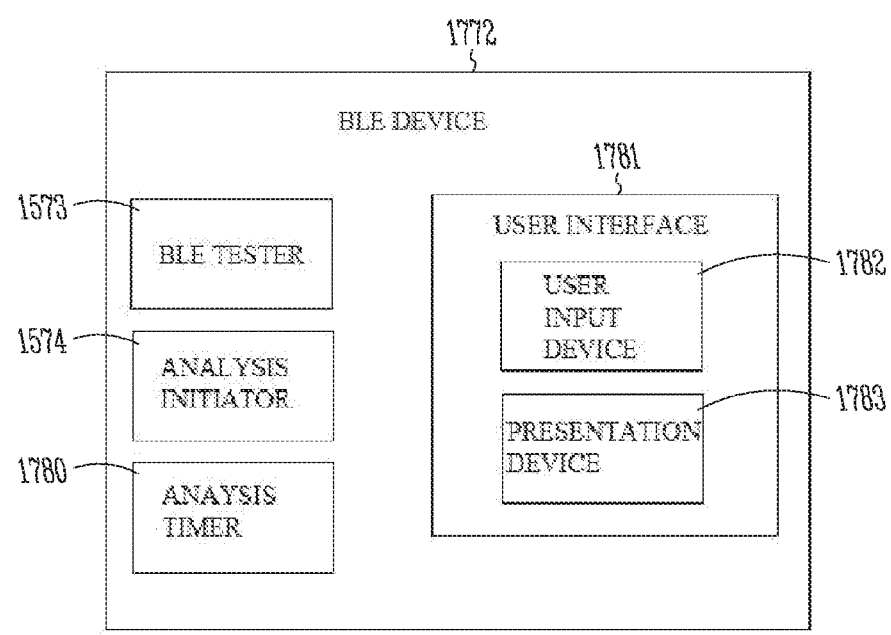
FIG. 17 illustrates a block diagram of BLE device embodiment including a BLE tester.

FIG. 17 illustrates a block diagram of BLE device embodiment including a BLE device 1772 that includes the BLE tester 1573. The BLE device 1772 represents an embodiment of the BLE device 1572 or the communicator/programmer 1672 and includes the BLE tester 1573, the analysis initiator 1574, optionally an analysis timer 1780, and a user interface 1781. The user interface 1781 may include a user input device 1782 and a presentation device 1783.

In one embodiment, the analysis initiator 1574 is configured to generate the test command in response to a request of a user who wants to invoke a BLE wireless test mode as a diagnostics tool for analyzing all channels in a troubled office environment. The user input device 1782 is configured to receive the signal requesting the diagnostic analysis of the environment of the wireless communication from the user. In one embodiment, the analysis initiator 1574 is configured to generate the test command in response to a request generated by a device that automatically determines a need to invoke the BLE wireless test mode.

In one embodiment, the analysis initiator 1574 is configured to generate the test mode according to a specified schedule, such as on a periodic basis. The analysis timer 1780 times the specified schedule, such as a specified period, and transmits the signal requesting the diagnostic analysis of the environment of the wireless communication to the analysis initiator as scheduled. This provides for active analysis of the environment. The result of the active analysis may include a list of available channels for the data transmission over the wireless link 1575. In one embodiment, the analysis initiator 1574 generates the test command based on the specified schedule as well as the operation status of the wireless communication circuit 1571. For example, the analysis initiator 1574 may generate the test command only when the wireless communication circuit 1571 is not receiving or transmitting data, such as when the hearing aid 1672 is in an idle state.

In response to the test command, the BLE tester 1573 performs an analysis including one or more wireless test modes. The outcome of the analysis may include the channel metrics and/or the channel map. In various embodiments, portions of the outcome of the analysis, such as selected channel metrics and the channel map, are presented using the presentation device 1783. In various embodiments, the outcome of the analysis may be used to enable or disable each channel of the plurality of wireless channels on the wireless link 1575 and/or provides clues to the user, such as a technical support specialist, as to why the user is unable to achieve the throughput or connections as specified by the hearing aid manufacturer.

Examples of the test command include a Transmitter Test command and a Receiver Test commands. These commands enable the device to transmit or receive test packets of a specified length with a specified modulation on a specified channel. The Receiver Test command returns the number of packets received during the burst of packets transmitted in response to the Transmitter Test command. An estimation of the number of packets transmitted can be done by using timers to control the length of time the base unit sends packets. The transmitter test commands results in one packet being sent every 625 μs. The BLE tester can calculate an approximate packet error rate (PER) from these values.

Examples of the test command also include a Get RSSI command associated with a Get RSSI mode. A Get Channel Map command associated with a Get Channel Map mode, and a Set Channel Map command associated with a Set Channel Map mode. The Get RSSI mode functions (in obtaining the channel metrics) when a valid packet is received. If interference exists in the wireless communication environment causing packets to be missed on a given channel, the Get RSSI command will return a value of "0" for that channel.

The Get Channel map mode is responded with a current channel map for the wireless communication environment. If adaptive frequency hopping (AFH) is employed, channels that are interfered with are removed from the channel map by the AFH algorithm. The Set Channel Map mode allows the user to enable, or disable channels independent of AFH.

Various wireless test modes for testing a BLE based hearing aid have been tested using a personal computer and/or another device configured to wirelessly communicate with the hearing aid and function as the BLE tester. In various embodiments, the test command may be associated with one or more of these wireless test modes. In the following examples (1-6) of the wireless test modes, "the PC" refers to the personal computer and/or the other device, and "the HA" refers to the hearing aid under test. The Examples include:

1) Continuous packet transmit mode. The HA transmits packets with pseudo random data over the BLE channels, to be used by the PC for RF characterization.
2) Downlink PER test mode. The PC transmits bursts of data. The HA receives the bursts of data and calculates PER.
3) Uplink PER test mode. The HA transmits bursts of data. The PC receives the bursts of data and calculates PER.
4) Echo packet mode. The PC transmits a packet. The HA echoes the packet. The HA retransmits the packet. The PC receives the echoed packet and calculates PER.
5) Antenna test profile model. The HA transmits an unmodulated carrier signal. The PC detects the transmitted signal.
6) RSSI test mode. The HA has ability to report RSSI. The PC sets up connection with the HA and transmits "send RSSI packet". The HA receives "send RSSI packet" and calculates RSSI for received packet. The HA then sends packet with received RSSI value and channel number. The PC iterates on next channel in sequence. This process repeats for user a specified number of channels.

These example wireless test modes may be used for the BLE wireless communication as well as wireless communication in general, including communications over the wireless links discussed in this document. In various embodiments, the wireless test modes can also aid manufacturing test, especially when wireless testing is not supported in a conventional communication protocol, such as with the BLE protocol.

Figure 18:
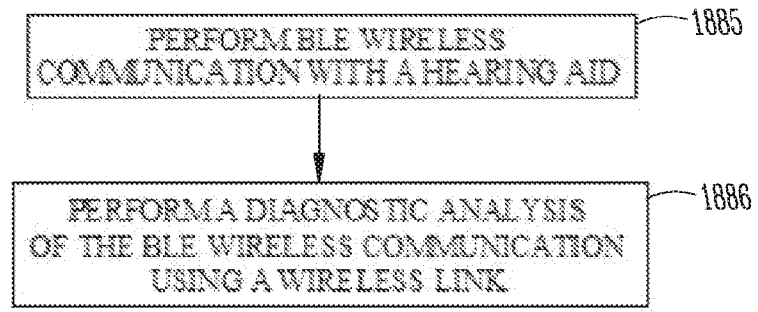
FIG. 18 illustrates an embodiment of a method for managing a BLE wireless communication link.

FIG. 18 illustrates an embodiment of a method for managing a BLE wireless communication link. In one embodiment, the method is performed using the BLE tester 1573, with a device including the wireless communication circuit 1571 as the DUT. In various embodiments, the device includes a hearing aid.

At 1885, wireless communication is performed with the hearing aid using BLE wireless communication technology. At 1886, a diagnostic analysis of an environment of the wireless communication is performed. Various embodiments of the diagnostic analysis use one or more of the wireless test modes discussed in this document, including the wireless test modes according to which the BLE tester 1573 performs a test in response to the test command. In one embodiment, the diagnostic analysis is performed in response to a request from a user, such as when the user encounters difficulty in communicating with the hearing aid. In another embodiment, the diagnostic analysis is performed according to a specified schedule, such as on a periodic basis to actively assess the environment of the wireless communication.

Figure 19:
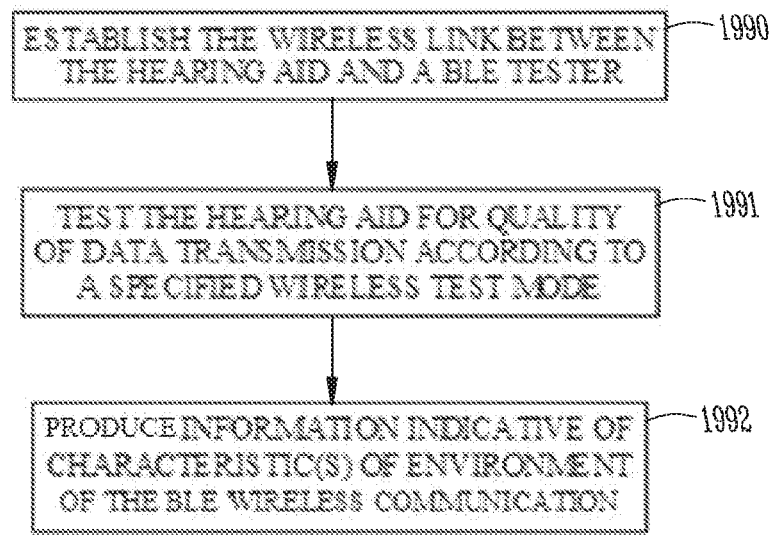
FIG. 19 illustrates an embodiment of a method for performing a diagnostic analysis of a BLE wireless communication link.

FIG. 19 illustrates an embodiment of a method for performing the diagnostic analysis. At 1990, a wireless link is established between the hearing aid and the BLE tester for the diagnostic analysis. At 1991, the hearing aid is tested for quality of data transmission associated with the wireless link according to a specified wireless test mode. At 1992, information indicative of one or more characteristics of the environment of the wireless communication is produced. In various embodiments, the information includes at least one channel metric for each channel of a plurality of wireless communication channels. The channel metric is indicative of quality of data transmission performed using each channel. Examples of the channel metric include BER, PER, CRC errors, FEC errors, SNR, number of retransmissions, and RSSI. In various embodiments, the information may also include a channel map indicative of quality of data transmission using each channel of the plurality of wireless communication channels. In various further embodiments, the hearing aid is reprogrammed for adjusting the settings related to the wireless communication using the channel metrics and/or the channel map.

In various embodiments, the circuit of each device discussed in this document, including each circuit of various elements of the BLE devices 1570 and 1572 as discussed in this document, is implemented using hardware, software, firmware or a combination of hardware, software and/or firmware. In various embodiments, the BLE tester 1571 may be implemented using one or more circuits specifically constructed to perform one or more functions discussed in this document or one or more general-purpose circuits programmed to perform such one or more functions. Examples of such general-purpose circuit can include a microprocessor or a portion thereof, a microcontroller or portions thereof, and a programmable logic circuit or a portion thereof.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices. It is understood that other hearing assistance devices not expressly stated herein may be used in conjunction with the present subject matter.

One of ordinary skill in the art will understand that, the modules and other circuitry shown and described herein can be implemented using software, hardware, and combinations of software and hardware. As such, the terms module and circuitry, for example, are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented using a data signal embodied in a carrier wave or propagated signal, that represents a sequence of instructions which, when executed by one or more processors cause the processor(s) to perform the respective method. In various embodiments, the methods are implemented as a set of instructions contained on a computer-accessible medium capable of directing a processor to perform the respective method. In various embodiments, the medium is a magnetic medium, an electronic medium, or an optical medium.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system for communicating with a hearing aid, comprising:
   a Bluetooth Low Energy (BLE) tester circuit configured to communicate with the hearing aid via a wireless link including a plurality of wireless communication channels using BLE wireless communication technology and to produce a channel metric for each channel of the plurality of wireless communication channels under a wireless test mode, the channel metric for each channel indicative of quality of data transmission performed through that channel; and
   an analysis initiator circuit coupled to the BLE tester circuit and configured to initiate the wireless test mode.

2. The system of claim 1, wherein the BLE tester circuit is configured to enable or disable each channel of the plurality of wireless communication channels based on the channel metric produced for that channel.

3. The system of claim 2, further comprising a user input device configured to receive a signal, and wherein the analysis initiator circuit is configured to initiate the wireless test mode in response to the received signal.

4. The system of claim 2, wherein the analysis initiator circuit is configured to initiate the wireless test mode based on a specified schedule and an operation status of the hearing aid.

5. The system of claim 2, comprising:
   a programmer; and
   a communicator connected to, integrated with, or built within the programmer, the communicator including the BLE tester circuit and the analysis initiator circuit.

6. The system of claim 2, comprising:
   a hearing assistance device; and
   a communicator connected to, integrated with, or built within the hearing assistance device, the communicator including the BLE tester circuit and the analysis initiator circuit.

7. The system of claim 2, comprising:
an assisted listening device; and
a communicator connected to, integrated with, or built within the assisted listening device, the communicator including the BLE tester circuit and the analysis initiator circuit.

8. The system of claim 2, comprising:
a steaming audio device; and
a communicator connected to, integrated with, or built within the steaming audio device, the communicator including the BLE tester circuit and the analysis initiator circuit.

9. The system of claim 2, comprising:
a wireless audio controller; and
a communicator connected to, integrated with, or built within the wireless audio controller, the communicator including the BLE tester circuit and the analysis initiator circuit.

10. The system of claim 1, wherein the BLE tester circuit is configured to produce a channel map using the produced channel metrics, the channel map indicative of one or more channels of the plurality of wireless communication channels available for communicating with the hearing aid via the wireless link.

11. The system of claim 1, wherein the BLE tester circuit is configured to produce at least one of a bit error rate, a packet error rate, indication of cyclic redundancy check errors, indication of forward error correction errors, a signal to noise ratio, a number of retransmissions, or a receive signal strength indicator as the channel metric for each channel of the plurality of wireless communication channels.

12. A method for communicating with a hearing aid, comprising:
establishing communication between the hearing aid and a Bluetooth Low Energy (BLE) tester via a wireless link using BLE wireless communication technology;
performing communication between the hearing aid and the BLE tester via each channel of a plurality of wireless communication channels of the wireless link;
initiating a test of the hearing aid using the BLE tester according to a wireless test mode; and
producing channel metrics using the BLE tester under the wireless test mode, the channel metrics each indicative of quality of data transmission performed through a channel of the plurality of wireless communication channels.

13. The method of claim 12, further comprising adjusting settings of the hearing aid using the produced channel metrics.

14. The method of claim 12, further comprising producing a channel map using the produced channel metrics, the channel map indicative of one or more channels of the plurality of wireless communication channels available for communicating with the hearing aid via the wireless link.

15. The method of claim 14, further comprising enabling or disabling each channel of the plurality of wireless communication channels for performing the wireless communication based on the produced channel map.

16. The method of claim 12, wherein producing the channel metrics comprises producing at least one of a bit error rate, a packet error rate, indication of cyclic redundancy check errors, indication of forward error correction errors, a signal to noise ratio, a number of retransmissions, or a receive signal strength indicator for each channel of the multiple channels.

17. The method of claim 16, wherein producing the channel metrics comprises producing the packet error rate.

18. The method of claim 16, wherein producing the channel metrics comprises producing a received signal strength indicator.

19. The method of claim 12, wherein initiating the test of the hearing aid comprises initiating the test of the hearing aid in response to a signal received from a user.

20. The method of claim 12, wherein initiating the test of the hearing aid comprises initiating the test of the hearing aid in response to a signal generated by a device.

* * * * *